(12) United States Patent
Jacob

(10) Patent No.: US 9,261,053 B2
(45) Date of Patent: Feb. 16, 2016

(54) SELF-IGNITING INTERNAL COMBUSTION ENGINE WITH ETHER FUMIGATION OF THE COMBUSTION AIR FOR VEHICLES AND A METHOD FOR ETHER FUMIGATION OF THE COMBUSTION AIR IN A SELF-IGNITING INTERNAL COMBUSTION ENGINE FOR VEHICLES

(75) Inventor: Eberhard Jacob, Krailling (DE)

(73) Assignee: MAN Truck & Bus AG, Munich (DE)

( * ) Notice: Subject to any disclaimer, the term of this patent is extended or adjusted under 35 U.S.C. 154(b) by 1131 days.

(21) Appl. No.: 12/735,833

(22) PCT Filed: Jul. 8, 2009

(86) PCT No.: PCT/EP2009/004949
§ 371 (c)(1),
(2), (4) Date: Sep. 28, 2010

(87) PCT Pub. No.: WO2010/003664
PCT Pub. Date: Jan. 14, 2010

(65) Prior Publication Data
US 2011/0005501 A1 Jan. 13, 2011

(30) Foreign Application Priority Data
Jul. 9, 2008 (DE) .......................... 10 2008 032 253

(51) Int. Cl.
*F02D 19/06* (2006.01)
*F02M 25/07* (2006.01)
(Continued)

(52) U.S. Cl.
CPC ............. *F02M 25/0742* (2013.01); *F01N 5/02* (2013.01); *F02D 19/06* (2013.01); *F02M 25/074* (2013.01);
(Continued)

(58) Field of Classification Search
CPC ..... F02M 31/08; F02M 31/18; F02M 31/183; F02M 2200/953; F02M 25/0742; F02D 19/02; F02D 19/06; F02D 19/0642; F02D 19/0647
USPC ................................. 123/568.15, 431; 60/303
See application file for complete search history.

(56) References Cited

U.S. PATENT DOCUMENTS 2,014,408 A * 9/1935 Woodhouse et al. .......... 568/698
4,422,412 A * 12/1983 Norton .............................. 123/3
(Continued)

FOREIGN PATENT DOCUMENTS

EP        0032003 A1    12/1980
GB        2 320 056 A    6/1998
(Continued)

OTHER PUBLICATIONS

Translation of Office Action and Search Report dated Sep. 7, 2012 from corresponding Chinese Application No. 200980101039.X.
(Continued)

*Primary Examiner* — Lindsay Low
*Assistant Examiner* — Robert Werner
(74) *Attorney, Agent, or Firm* — Wolf, Greenfield & Sacks, P.C.

(57) ABSTRACT

The invention relates to a self-igniting internal combustion engine (10) with ether fumigation of the combustion air for vehicles, wherein to provide for ether fumigation, a feed means (1, 2, 3) is provided for an alkanol fuel in the flow direction, an exhaust gas heat exchanger (4) is provided for cooling a portion of the exhaust gas arising from the firing of the internal combustion engine (10) and for vaporizing the alkanol fuel fed while at the same time absorbing the thermal energy to be dissipated during cooling of the exhaust gas, and a catalyst (5) is provided for dehydrating the evaporated alkanol fuel to form ether, and wherein the feed means (1, 2, 3), the exhaust gas heat exchanger (4) and the catalyst (5) are connected to the combustion chamber of the internal combustion engine (10) and adapted in such a way that a portion of the fuel required to fire the internal combustion engine (10) can be fed to the combustion chamber of the internal combustion engine (10) by way of the ether fumigation of the combustion air while mixing in the exhaust gas cooled in the exhaust gas heat exchanger (4). The invention further relates to a method for ether fumigation of the combustion air in a self-igniting internal combustion engine for vehicles.

10 Claims, 4 Drawing Sheets

(51) Int. Cl.
*F01N 5/02* (2006.01)
*F02B 3/06* (2006.01)
*F02B 29/04* (2006.01)

(52) U.S. Cl.
CPC ....... *F02M 25/0731* (2013.01); *F02M 25/0751* (2013.01); *F01N 2240/02* (2013.01); *F02B 3/06* (2013.01); *F02B 29/0425* (2013.01); *F02M 25/0707* (2013.01); *F02M 25/0728* (2013.01); *Y02T 10/121* (2013.01); *Y02T 10/16* (2013.01)

(56) References Cited

U.S. PATENT DOCUMENTS

| | | | | |
|---|---|---|---|---|
| 4,595,785 | A * | 6/1986 | Brake | 568/698 |
| 4,876,989 | A | 10/1989 | Karpuk et al. | |
| 5,097,803 | A * | 3/1992 | Galvin | 123/3 |
| 6,092,512 | A * | 7/2000 | Ma | 123/568.15 |
| 6,508,209 | B1 | 1/2003 | Collier, Jr. | |
| 7,444,815 | B2 * | 11/2008 | Baumgard et al. | 60/605.2 |
| 7,449,034 | B1 * | 11/2008 | Mikkelsen et al. | 44/302 |
| 7,823,570 | B2 * | 11/2010 | Cracknell et al. | 123/568.11 |
| 8,141,356 | B2 * | 3/2012 | Leone et al. | 60/601 |
| 8,550,058 | B2 * | 10/2013 | Pursifull et al. | 123/575 |
| 2007/0215125 | A1 | 9/2007 | Dearth et al. | |

FOREIGN PATENT DOCUMENTS

| | | |
|---|---|---|
| WO | WO 2004/033859 A1 | 4/2004 |
| WO | WO 2005/054657 A1 | 6/2005 |
| WO | WO 2008/066482 A1 | 6/2008 |

OTHER PUBLICATIONS

Armbruster et al. "On-board conversion of alcohols to ethers for fumigation in compression ignition engines" Inst. of Mechanical Engineers, 2003, pp. 155-164.
Official Action of Apr. 8, 2009 in corresponding German application.
Official Action of Jun. 17, 2010 in corresponding Russian application.
Office Action dated Mar. 11, 2013 from corresponding Chinese Application No. 200980101039.X.
Rejection Decision dated Jul. 4, 2013 from corresponding Chinese Application No. 200980101039.X.
European Office Action from corresponding EP 09 777 046.5, dated Nov. 30, 2011.
Office Action for CN200980101039.X, mailed Aug. 1, 2014.

* cited by examiner

SELF-IGNITING INTERNAL COMBUSTION ENGINE WITH ETHER FUMIGATION OF THE COMBUSTION AIR FOR VEHICLES AND A METHOD FOR ETHER FUMIGATION OF THE COMBUSTION AIR IN A SELF-IGNITING INTERNAL COMBUSTION ENGINE FOR VEHICLES

RELATED APPLICATIONS

This application is a U.S. National Stage application of International Application No. PCT/EP2009/004949, filed Jul. 8, 2009, which claims priority to German Patent Application No. 10 2008 032 253.9, filed Jul. 9, 2008, the contents of which are incorporated herein by reference in their entirety.

The invention relates to a self-igniting internal combustion engine with ether fumigation of the combustion air for vehicles according to the preamble of claim 1. The invention further relates to a method for ether fumigation of the combustion air in a self-igniting internal combustion engine for vehicles.

Legal requirements in the form of limit or target values for the release of certain pollutants exist now in all industrial states within the framework of worldwide efforts to reduce the emission of air pollution. These include exhaust gas emissions from diesel engines, in particular nitrogen oxides ($NO_x$) and carbon black (PM-particles), which have particular significance because of the volume of traffic which is increasing worldwide. There is therefore a need for engines with powerful combustion processes and exhaust gas aftertreatment, which are capable of satisfying the efforts for environmental protection and therefore increasingly strict exhaust gas standards, in particular with regard to the release of nitrogen oxides and carbon black.

The use of oxygen-containing fuels is known as a suitable means for reducing carbon black emissions. Engines, which are operated with methanol (cetane number about 3), ethanol (cetane number about 8), n-butanol (cetane number 17) or dimethyl ether (DME, cetane number about 55 to 80), emit practically no carbon black during lean operation. Cetane numbers >50 are necessary, however, to operate modern fast-running diesel engines, so methanol, ethanol and n-butanol cannot be used directly in self-igniting internal combustion engines or diesel engines because of their low cetane numbers, but make additional ignition aids necessary, such as, for example, glow plugs and/or ignition acceleration additives. While dimethyl ether is not to this extent subject to any restriction, restrictions nevertheless arise from the fact, however, that DME is a liquid under pressure with a boiling point of −26° C. and therefore, similarly to a liquid gas fuel (LPG—liquefied petroleum gas), requires a special logistic system, which is not provided in conventional vehicles with diesel engines.

A reduction in the nitrogen oxide emissions of diesel engines is possible by means of selective catalytic reduction, which has been known for more than 30 years as the SCR method (SCR—selective catalytic reduction). According to the method, an aqueous urea solution (AdBlue®) is added in the exhaust gas flow to a catalyst, whereby ammonia and water are formed in a hydrolysis reaction. The ammonia produced, in a so-called SCR catalyst, consisting either of titanium dioxide, vanadium pentoxide and tungsten oxide or of zeolites, at temperatures between 200 and 600° C., then reduces the nitrogen oxides contained in the exhaust gas to nitrogen. A very substantial removal of the nitrogen oxides from the exhaust gas is possible in this manner but the consumption of the aqueous urea solution amounts to up to about 8% of the diesel fuel quantity required to operate the engine and to this extent always has to be provided in a corresponding quantity in an additional tank.

In recent years, cooled exhaust gas recirculation (EGR) has proven to be an effective alternative to selective catalytic reduction for reducing the nitrogen oxide emissions of diesel engines, which are fired with low-sulphur, mineral oil-based diesel fuels. A portion of the exhaust gas is mixed here into the cooled intake or combustion air by means of a control valve, which allows a connection between the exhaust gas and intake air or combustion air channel, and feeds it therewith to the combustion chamber, so a temperature reduction in the diesel fuel combustion below the level necessary for nitrogen oxide formation is made possible. As an alternative, this temperature reduction may take place by means of direct exhaust gas introduction into the engine combustion chamber via an intake valve during the intake cycle. The temperature reduction by means of exhaust gas recirculation is to this extent based on the low combustion value of the oxygen-reduced diesel fuel-gas mixture provided in the combustion chamber. The exhaust gas recirculation rate in diesel engines is a maximum of 35% at full load. However, high EGR engines of this type are more expensive to produce than diesel engines without an EGR device as the high exhaust gas recirculation rates are connected with the production of high charge pressures, for example owing to two-stage charging with intermediate cooling and high fuel injection pressures of over 1,800 bar. When using oxygen-containing fuels, higher charge pressures can be dispensed with out emission drawbacks, and this in turn allows engine operation with a conventional, single-stage charge group.

Against the background that countries such as China, in particular, in a few years will have substantial production capacities for methanol from natural gas, with production costs of about 2 to 3 EUR/GJ, and from coal, at production costs of about 7 EUR/GJ, with a simultaneous shortage of mineral oil-based fuels, for which, moreover, production costs of about 16 EUR/GJ are estimated, and in Brazil bioethanol or biodiesel is today already comprehensively available, the environmentally specific requirements stated above for diesel engines or utility vehicles are just as relevant in engine operation with alkanol fuels as with mineral oil-based diesel fuels.

The fumigation concept has proven suitable for using methanol in diesel engines. A portion of the methanol is converted here in a catalytic reactor on board the vehicle into gaseous dimethyl ether and water vapour according to the equation:

$$2CH_3OH \rightarrow (CH_3)_2O + H_2O \qquad (1)$$

and is directly mixed into the combustion air. The catalytic reactor contains aluminium oxide pellets as the catalyst. Aluminium oxide ($\gamma\text{-}Al_2O_3$) has proven to be the most active catalyst for the reaction according to Equation 1 and is also distinguished by its high thermal stability. In order, for example, to be able to supply sufficient dimethylethylene to fumigate a 180 kW engine, 0.7 kg of the $\gamma\text{-}Al_2O_3$ catalyst are required. A reactor wall temperature of >250° C., which can be achieved in a cold start by means of a methanol burner within 25 s, is also necessary for a stable reaction course.

If, instead of methanol, ethanol is used as the fuel, analogously to the reaction according to Equation 1, the catalytic dehydration required for the fumigation takes place according to the equation:

$$2C_2H_5OH \rightarrow (C_2H_5)_2O + H_2O \qquad (2)$$

to form diethyl ether (cetane number 150) and water vapour.

Likewise, n-butanol (cetane number 17) can be dehydrated to form Di-n-butyl ether with a cetane number of 100.

A method of this type for converting alcohols into ethers for fumigation in diesel engines operated by methanol is known from the journal "Proceedings of the Institution of Mechanical. Engineers", Part D: Journal of Automobile Engineering, Vol. 217, No. 3/2003, pages 155 to 164. According to this, a small portion of the methanol used as fuel is firstly catalytically converted in the vehicle into dimethyl ether and water. These conversion products are then fed via the combustion air to the engine in order to achieve engine performances and exhaust gas emissions as known from diesel engines operated by alcohol with additivation of the fuel with polyethylene glycol (PEG) as the ignition accelerator. Aluminium oxide ($\gamma$-$Al_2O_3$) in a fixed bed reactor is provided here as the catalyst, this being heated to up to 250° C. for the purpose of accelerating the methanol dehydration, and to this extent for the improvement of its cold start behaviour, by the hot combustion gases of an associated methanol burner.

Disclosed herein is a self-igniting internal combustion engine with ether fumigation of the combustion air for vehicles which, corresponding to the current prior art, is equipped with cooled exhaust gas recirculation and preferably also with exhaust gas turbo charging, and is suitable without substantial change to the logistic system conventional in modern diesel motors of this type and without additional ignition aids and ignition accelerators, both for firing with alkanol fuels and with low-sulphur, mineral oil-based diesel fuels and alkanol fuels, and allows a very substantial removal of nitrogen oxides and carbon black from the exhaust gas, while adhering to the relevant exhaust gas standards and without storage outlay for additional operating substances being used only for exhaust gas reduction, and which, in addition, can be produced and operated without substantial extra costs, in comparison to corresponding engines of known construction.

Some of the objectives discussed herein are achieved by a self-igniting internal combustion engine with ether fumigation of the combustion air for vehicles, which is suitable for carrying out a method for ether fumigation of the recirculated exhaust gas in an internal combustion engine for vehicles and wherein the internal combustion engine comprises for ether fumigation in the flow direction, an alkanol fuel delivery device, an exhaust gas heat exchanger for cooling a portion of the exhaust gas arising during the firing of the internal combustion engine and for evaporating the alkanol fuel fed while absorbing thermal energy to be dissipated during the cooling of the exhaust gas, and a catalyst for dehydrating the evaporated alkanol fuel to form ether, wherein the feed device, the exhaust gas heat exchanger and the catalyst are configured and connected to a combustion chamber of the internal combustion engine in such a way that a portion of the fuel required to fire the internal combustion engine can be fed by means of the ether fumigation of the combustion air, while mixing in the exhaust gas cooled in the exhaust gas heat exchanger, to the combustion chamber of the internal combustion engine.

The internal combustion engine according to some embodiments of the invention requires no substantial change to the logistic system and can be operated both with alkanol fuels and with low-sulphur, mineral oil-based diesel fuels and alkanol fuels without additional ignition aids.

Owing to the feeding of the highly cetane-containing ether, the willingness of the fuel-air mixture or combustion mixture (CM) to ignite is advantageously increased, so the addition of expensive ignition accelerators, which additionally frequently contain nitro compounds, can be dispensed with.

A very substantial reduction in the polluting emissions can be achieved by means of the ether fumigation according to the invention by means of a substantially improved homogenisation of the fuel-air mixture in the combustion chamber of the engine, with a simultaneous performance or efficiency increase of the engine. The internal combustion engine according to the invention to this extent in particular also satisfies the relevant legal exhaust gas standards, for example EU V (EU guide line 2006/51/EC) and EU VI (EU guide line appears 2009), relevant to utility vehicle engines, regarding the release of nitrogen oxides and carbon black; analogous legislation exists in the USA and in Japan.

A further advantage is that no additional operating substances, which are used exclusively for emission reduction, have to be supplied.

The structural modifications which are only slight in comparison to a conventional self-igniting engine with exhaust gas turbo charging and cooled exhaust gas recirculation, allow production of the engine according to the invention without substantial extra costs. A reduction in the operating costs is produced purely because of the aforementioned advantages compared with corresponding engines of known construction. The substantially extended area of use of the engine owing to the possibility of using mineral diesel fuels and alkanol fuels, advantageously ultimately also contributes to a reduction in the operating costs.

Further advantages of embodiments of and internal combustion engine as taught herein, or of the method as taught herein are described in detail below.

Monovalent or divalent alkanols are preferably used for the ether fumigation of the combustion gas and are provided in the vehicle by means of a fuel tank of conventional design which is suitable for this. To operate the engine, the alkanol fuel is firstly fed by at least one fuel delivery pump, in accordance with the structural circumstances in the vehicle from the fuel tank to the exhaust gas heat exchanger via at least one injection valve, for the purpose of distribution which is as uniform as possible. For use in the internal combustion engine according to the invention or in the method according to the invention, the monovalent alkanols methanol, ethanol, n-propanol and i-propanol, n-butanol and the divalent alkanol 1,2-ethanediol have proven to be advantageous, in particular.

The dehydration of the monovalent alkanols takes place according to Equations 1 and 2 given above to form dialkylethers. The divalent alkanols or alkanediols are catalytically converted according to the equation:

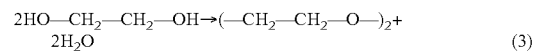

$$2HO-CH_2-CH_2-OH \rightarrow (-CH_2-CH_2-O-)_2 + 2H_2O \qquad (3)$$

Thus, for example, 1,2-ethanediol is converted to dioxane (Kp=100° C.). These ethers—dialkyl ether and dioxane—are preferably used in the ether fumigation according to the invention.

It is particularly preferable to not only feed an alkanol fuel by means of the ether fumigation of the combustion air, or the recirculated exhaust gas and the combustion air, for motor combustion, but to also introduce it, as during operation of a conventional diesel engine, from a fuel tank, preferably from a common fuel tank, using a fuel delivery pump, by means of direct injection into the combustion chamber. A self-igniting alkanol engine of this type with exhaust gas recirculation and ether fumigation allows very substantially nitrogen oxide-free operation without the addition of ignition accelerators. A further advantage of this engine according to the invention is that only one fuel tank is necessary.

Alternatively, it is preferred that, by direct injection into the combustion chamber, a diesel fuel, in particular a low-sulphur, mineral oil-based diesel fuel, be fed in the aforementioned manner via the fuel tank, fuel delivery pump and direct injection, and simultaneously an alkanol fuel is introduced by ether fumigation of the combustion air or the recirculated exhaust gas and the combustion air, each of the two types of fuel proportionately covering the energy requirement to operate the engine. The usability according to the invention of conventional, easily obtainable mineral diesel fuels, apart from alkanol fuels, advantageously increases the area of use of the engine and also leads to a saving of operating costs, in particular also against the background of the forecast price development for the next decades in the case of alkanols and mineral oil-based diesel fuels, according to which alkanols will be significantly more economical to obtain than mineral oil-based diesel fuels.

With regard to a reduction of nitrogen oxides and an improvement of the willingness of the combustion mixture to ignite, it has surprisingly proven to be optimal both in the alkanol motor according to the invention and in the diesel-alkanol motor, if about 5 to 40%, in particular about 10 to 35% and particularly about 25% of the total fuel necessary to fire the internal combustion engine is fed by means of ether fumigation and the remaining fraction by means of direct injection for engine combustion. In the internal combustion engine according to the invention, this is taken into account by a corresponding design of the fuel feed means, the exhaust gas heat exchanger and the catalyst, optionally including suitable control or regulating devices.

The above-mentioned self-igniting alkanol engine is an important application of the method according to the invention and its fuel requirement is, in particular, 5 to 40% implemented by means of the gas phase, namely by means of the exhaust gas to which ethers are added and to this extent is to be called a self-igniting alkanol internal combustion engine with ether fumigation of the recirculated exhaust gas. It has proven to be particularly advantageous if about 10 to 35% and in particular about 25% of the total fuel requirement necessary to fire the internal combustion engine (10) according to the invention is provided by means of the gas phase.

According to the invention a substantial reduction in the nitrogen oxide formation is to be achieved by the exhaust gas recirculation during the engine combustion. A further reduction is possible when using the given oxygen-containing fuels by increasing the water vapour concentration or the water vapour content in the combustion gas and the accompanying increase in the heat capacity of the combustion gas. The water vapour concentration can be controlled, on the one hand, by means of the water released during the dehydration according to the above Equations 1 to 3. According to the invention it is, however, preferred that for this purpose a suitable water feed means is provided in the flow direction between the catalyst and the combustion chamber of the internal combustion engine, with which the water is introduced into the combustion chamber by means of the combustion air, the recirculated exhaust gas and/or the alkanol ether. Alternatively or in addition, the introduction of water by means of the directly injected fuel is preferred.

The internal combustion engine according to the invention is operated for the purpose of a performance increase with compressed and cooled combustion air. It therefore comprises, in the flow direction between a charge air inlet and the combustion chamber, an exhaust gas turbo charger, in particular an exhaust gas turbo charger for pressure charging or a pressure wave charger for impact charging, and a combustion air cooler for cooling the compressed combustion air before entry into the combustion chamber.

An efficient exhaust gas recirculation and utilisation, taking into account the respective engine performance and design, is ensured according to the invention by a single-flow or multi-flow, in particular double-flow, design of the exhaust gas path for the recirculated exhaust gas.

The preferred configuration of the exhaust gas recirculation, including the exhaust gas heat exchanger, ensures that the alkanol fuel vapours can be fed at a temperature of >200° C., in particular about 210 to 240° C. and particularly of about 220° C. to the catalyst, whereby the catalytic dehydration is advantageously influenced.

The internal combustion engine according to the invention preferably has a honeycomb-like carrier catalyst—preferably made of metal—which is coated with titanium dioxide or mixtures of titanium dioxide, silicon dioxide and/or aluminium dioxide or iron zeolites as the active components for the catalytic reactions. Catalysts of this type have until now been successfully used as hydrolysis catalysts for urea for onboard production of ammonia by the SCR technique.

The honeycomb-like metal carrier catalyst is preferably manufactured from a metal foil with a thickness of about 20 to 50 μm, in particular of about 25 to 40 μm and particularly of about 30 μm. It is fine-celled as far as possible with a cell density of about 400 to 800 cpsi, in particular about 500 to 800 cpsi and particularly about 600 cpsi. The active component for the catalytic reactions is applied as a washcoat coating with a low application concentration of about 5 to 100 g metal oxide/l, in particular about 10 to 40 g metal oxide/l and particularly about 20 g metal oxide/l, on the honeycomb-like carrier catalyst, which is preferably configured as a metal carrier catalyst, in order to reduce the limitation of the conversion speed of alkanol into alkyl ether by pore diffusion. The catalyst preferably has a diameter of about 20 to 100 mm, in particular of about 40 to 80 mm, and particularly of about 60 mm, and a length of about 50 to 400 mm in particular of about 100 to 300 mm, and particularly of about 200 mm.

Titanium dioxide as the active component is superior to other oxides with respect to its activity in catalytic reactions, in which water is involved. In addition, titanium dioxide is resistant to sulphation and can therefore also be used in the case of low sulphur contents of the fuels. In comparison to this, $\gamma\text{-}Al_2O_3$ and other substances described in the literature can only be used for coating the carrier catalyst together with exhaust gases which are absolutely sulphur-free. Thus, a sulphur content of a fuel of about <10 ppm is already sufficient to deactivate a $\gamma\text{-}Al_2O_3$ catalyst in a relatively short time.

It is furthermore preferred for the exhaust gas heat exchanger to have, for the purpose of a controlled return of the cooled exhaust gas to the combustion chamber, one pressure injection valve per outlet.

An exhaust gas recirculation valve is also preferably provided in the or each exhaust gas recirculation path, by means of which, with a respective suitable line guidance, the exhaust gas mixed with the ether can be fed in a controlled manner to the combustion air, the exhaust gas can be fed in a controlled manner to the ether before mixing with the combustion air or the exhaust gas can be fed in a controlled manner to the ether already mixed with the combustion air.

The internal combustion engine according to the invention thus preferably in detail has guide means and at least one exhaust gas recirculation valve, these features being configured and connected to one another in such a way that the exhaust gas cooled in the exhaust gas heat exchanger and the ether formed in the catalyst, in a controllable manner by means of the or each exhaust gas recirculation valve, can be mixed with the compressed and cooled combustion air.

It is alternatively preferred for the guide means and the at least one exhaust gas recirculation valve to be configured and connected to one another in such a way that the exhaust gas cooled in the exhaust gas heat exchanger can firstly be added in a controllable manner to the ether formed in the catalyst and then the exhaust gas-ether mixture formed in this manner can be mixed with the compressed and cooled combustion air.

According to a second preferred feed alternative, the guide means and the at least one exhaust gas recirculation valve are configured and connected to one another in such a way that the exhaust gas cooled in the exhaust gas heat exchanger can be mixed in a controlled manner and the ether formed in the catalyst can be mixed directly with the compressed and cooled combustion air.

According to a third preferred feed alternative, the guide means and the at least one exhaust gas recirculation valve are finally configured and connected to one another in such a way that the exhaust gas cooled in the exhaust gas heat exchanger can be mixed in a controlled manner with the compressed and cooled combustion air and the ether formed in the catalyst can be mixed directly with the compressed and uncooled combustion air.

In this feed alternative, the catalyst is connected by suitable guide means to the combustion air line between the exhaust gas turbo charger and the combustion air cooling area, as a result of which firstly the mixing of the ether with the compressed combustion air and then, by means of the combustion air cooling area arranged in the combustion air line, the cooling of the ether-combustion air mixture is made possible. The controlled adding of the cooled exhaust gas takes place in all three feed alternatives by means of the at least one exhaust gas recirculation valve via at least one line between the exhaust gas recirculation valve and the combustion air line in the region between the combustion air cooling area and the intake section of the engine.

The ether combustion air mixture produced according to these configuration or feed alternatives and enriched with cooled exhaust gas is introduced into the combustion chamber and forms, together with the fuel directly injected into the combustion chamber, the combustion mixture required to operate the internal combustion engine according to the invention.

For the exhaust gas treatment, the internal combustion engine according to the invention has, according to an advantageous embodiment variant in the exhaust gas path, an oxidation catalyst with platinum and/or palladium as the active component(s) in order to effectively prevent the emission of carbon monoxide and alkanes, in particular, however, that of aldehydes (formaldehyde, acetaldehyde and higher aldehydes).

Preferred embodiments of the internal combustion engine according to the invention with ether fumigation of the combustion air for vehicles are depicted in the accompanying FIGS. 1 to 4, in which:

FIG. 1 shows the overall system according to the invention in an embodiment with a six-cylinder utility vehicle engine (10) with an exhaust gas turbo charger (11) and double-flow exhaust gas recirculation, as can be obtained, for example, from the Applicant with the designation engine D 2066.

Figure 1:
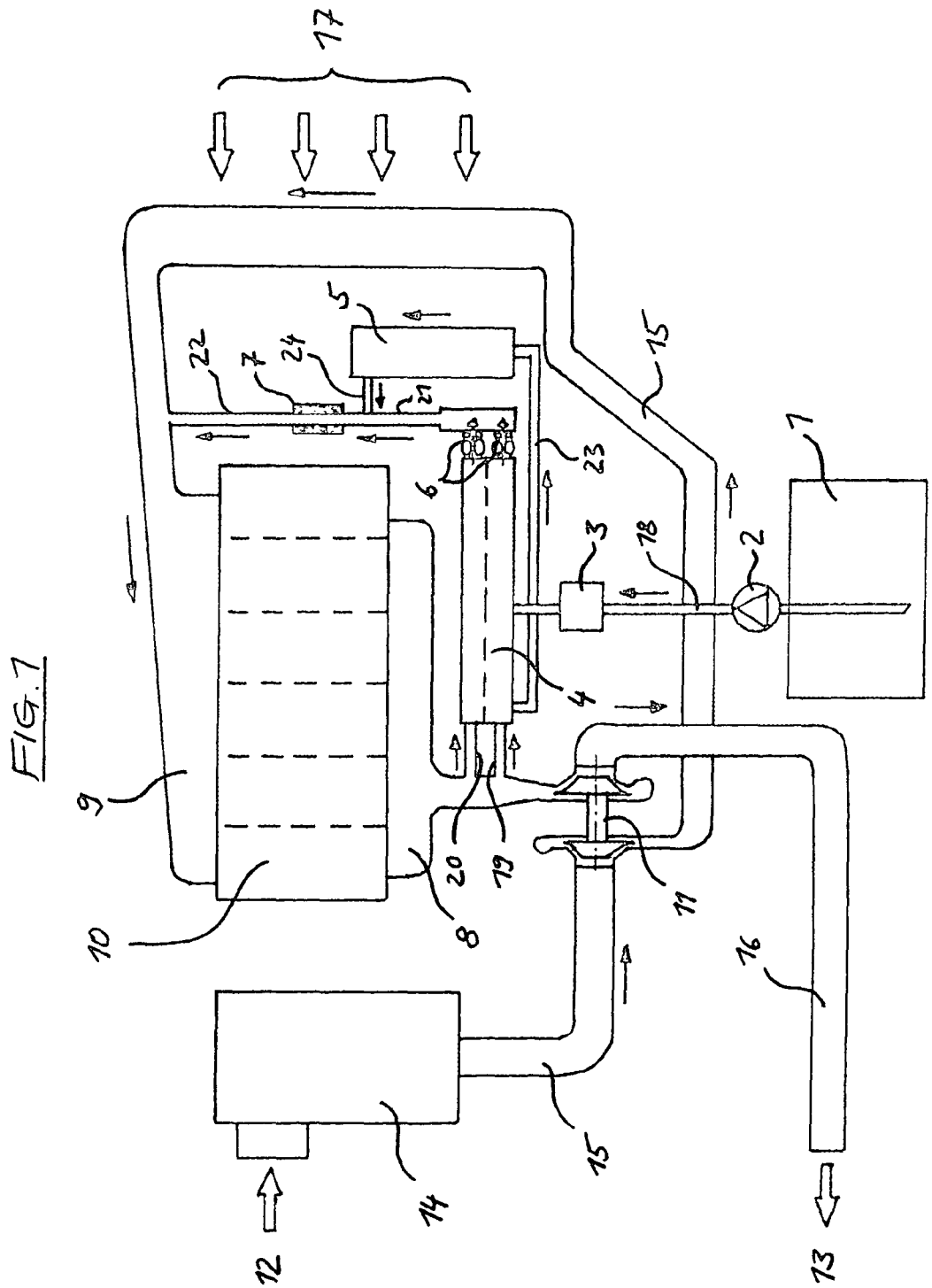
FIG. 1 shows an embodiment of the internal combustion engine according to the invention in a schematic view as a six-cylinder utility vehicle engine with ether fumigation and double-flow exhaust gas recirculation, giving the flow courses for fuel, exhaust gas and combustion air.

A fuel tank (1) is provided to provide an alkanol fuel and is connected by a first line (18), a fuel pump (2) and an injection valve (3) to a first inlet of an exhaust gas heat exchanger (4). Configured between the first inlet and a first outlet in the exhaust gas exchanger (4) is a first region for evaporating the alkanol fuel while absorbing thermal energy. To provide the required thermal energy, the exhaust gas heat exchanger (4) has a second region between a second inlet and a second outlet and has a third region between a third inlet and a third outlet, the second and third inlet in each case being directly connected by a second and third line (19, 20) to the exhaust gas outlet (8) of the engine (10). An optimum heat transfer from the second and third region to the first region is ensured by a corresponding structural design of the three regions of the exhaust gas heat exchanger (4), so the evaporated alkanol fuel can be provided at a temperature>200° C. at the first outlet of the exhaust gas heat exchanger (4) and the respective cooled exhaust gas can be provided for forwarding at the second and third outlet.

To forward the cooled exhaust gas from this two-flow exhaust gas heat exchanger (4), the second and third outlet are connected by a respective pressure peak valve (6) to a common fourth line (21), which is connected to an EGR valve (7). The EGR valve (7) is directly connected to the intake section (9) of the engine (10) by means of a fifth line (22). Provided forward the evaporated alkanol fuel from the first outlet of the exhaust gas heat exchanger (4) is a sixth line (23), which is connected to the inlet of a catalyst (5). The catalyst (5), as the active component, has titanium dioxide for dehydration of the alkanol fuel vapours leaving the heat exchanger (4) at a temperature of >200° C. to form dialkyl ether, according to the above Equation 1 or 2. The outlet of the catalyst (5) is connected by a seventh line (24) to the fourth line (21), for the ether fumigation of the cooled exhaust gas leaving the exhaust gas heat exchanger (4) and for the subsequent introduction of the ether-exhaust gas mixture arising in the process into the engine (10). The fuel feed required to fire the six indicated combustion chambers or cylinders of the engine (10) by the associated direct injection system is carried out in the conventional manner for self-igniting engines and to this extent not emphasised in the drawings.

The combustion air path comprises, in the flow direction, a charge air inlet (12), an air filter (14), a combustion air line (15) with the compressor wheel of an exhaust gas turbo charger (11) and with a combustion air cooling area (17) and the intake section (9) of the engine (10). The exhaust gas path comprises, in the flow direction, the exhaust gas outlet (8) of the engine (10), the turbine wheel of the exhaust gas turbo charger (11), and exhaust line (16) and an exhaust gas outlet (13).

Figure 2:
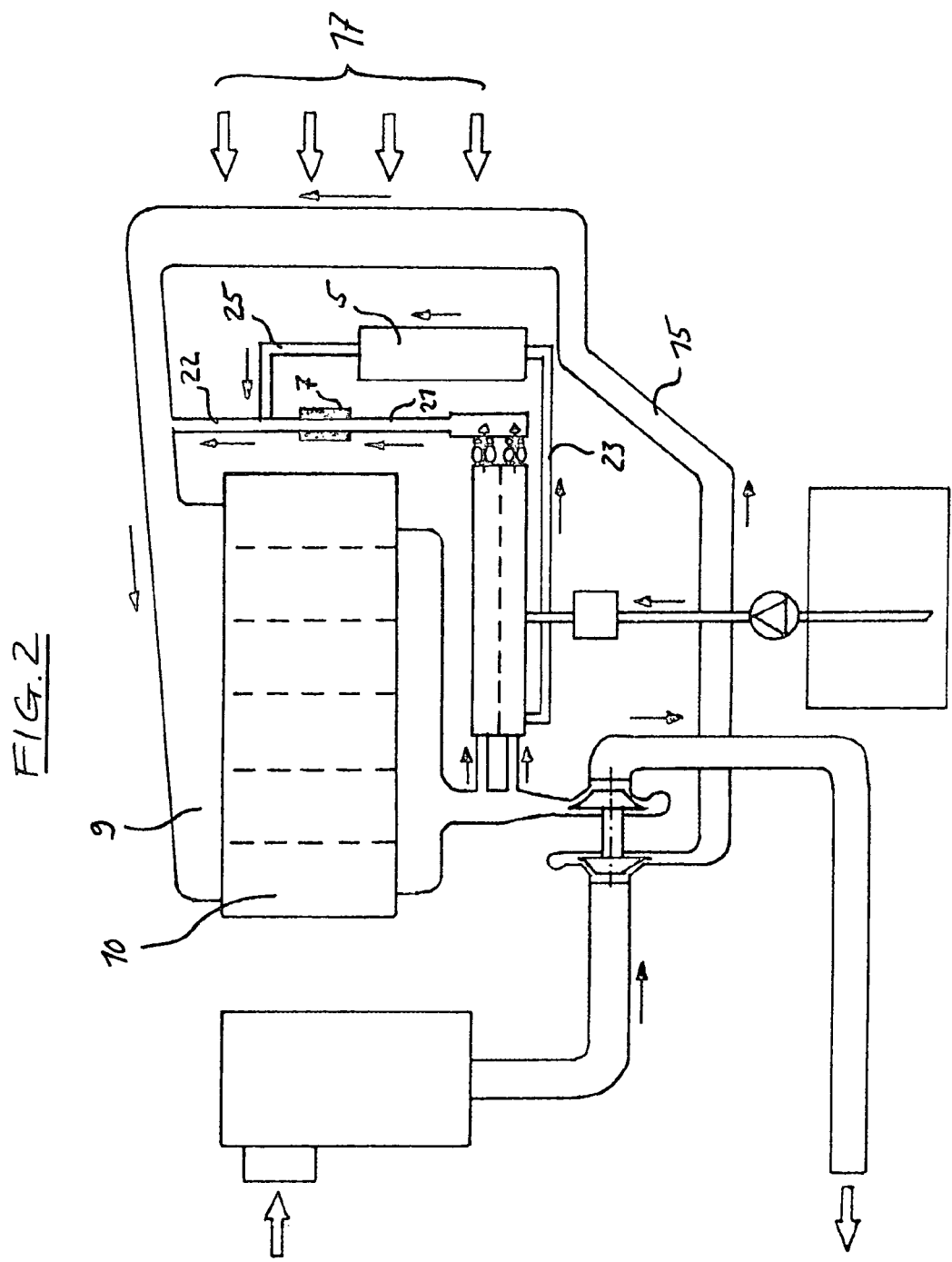
FIG. 2 shows the embodiment of the internal combustion engine according to the invention according to FIG. 1 with a first alternative ether introduction.

The embodiment shown in FIG. 2 of the internal combustion engine according to the invention, as an alternative to the seventh line (24), has an eighth line (25), which connects the outlet of the catalyst (5) to the fifth line (22) bypassing the EGR valve (7). Thus, this embodiment of the internal combustion engine according to the invention also comprises—corresponding to that shown in FIG. 1—an ether fumigation of the recirculated exhaust gas.

Figure 3:
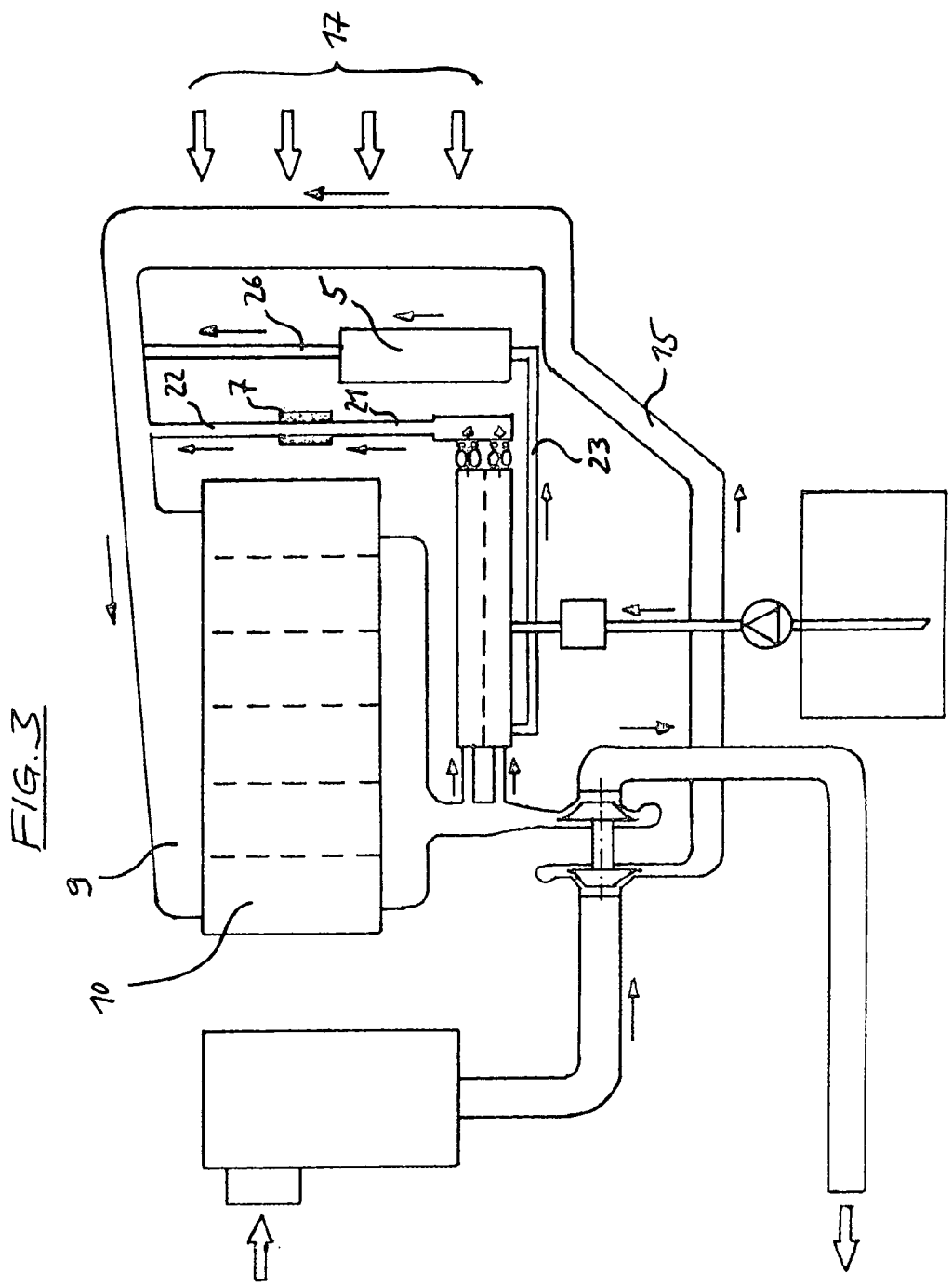
FIG. 3 shows the embodiment of the internal combustion engine according to the invention according to FIG. 1 with a second alternative ether introduction.

FIG. 3 is a view of the internal combustion engine according to the invention with a further alternative ether introduction bypassing the EGR valve (7), the outlet of the catalyst (5), via a ninth line (26), which replaces the seventh line (24) in FIG. 1, being directly connected to the combustion air line (15) between the combustion air cooling area (17) and the intake section (9) of the engine (10) and to this extent being directly mixable with the compressed and cooled combustion air.

Figure 4:
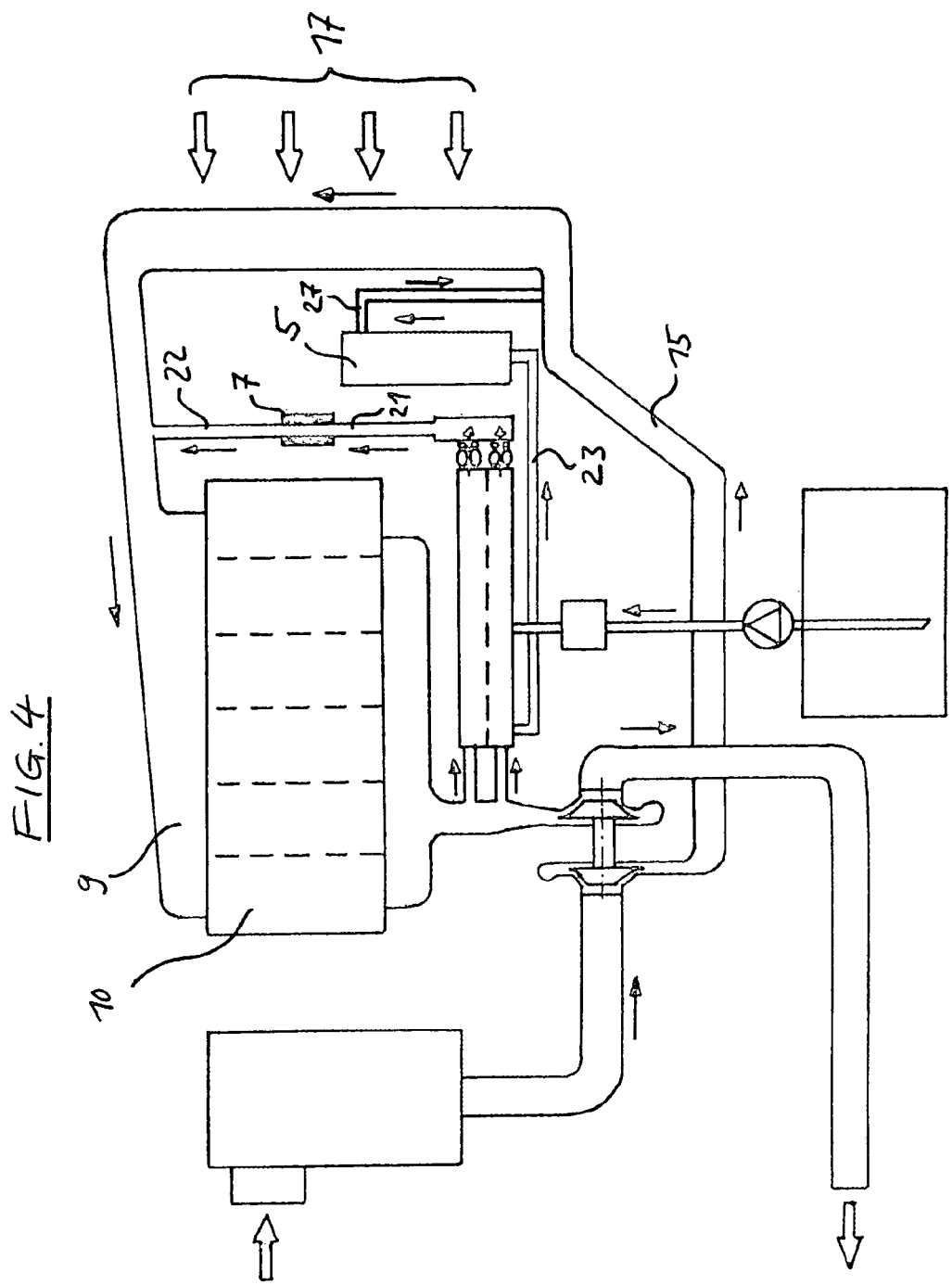
FIG. 4 shows the embodiment of the internal combustion engine according to the invention according to FIG. 1 with a third alternative ether introduction.

A last alternative ether introduction in an internal combustion engine according to the invention according to FIG. 1 is shown in FIG. 4. The outlet of the catalyst (5) is directly connected here by a tenth line (27), which in turn replaces the seventh line (24) in FIG. 1, to the combustion air line (15) upstream of the combustion air cooling area (17), so a mixing of the evaporated alkanol fuel with the compressed combustion air and cooling of this mixture before adding the cooled exhaust gas is made possible.

It is also the object of the present invention to disclose a method for ether fumigation of the combustion air in a self-igniting internal combustion engine for vehicles according to the preamble of claim 11, which overcomes the drawbacks of the prior art given in detail above and, in particular can be applied using the internal combustion engine according to at least any one of claims 1 to 10.

This object of the invention is achieved by a method according to claim 11, which, according to the invention, is suitable for use in a self-igniting internal combustion engine with ether fumigation of the combustion air for vehicles according to claim 1 and has the method steps:
(a) providing an alkanol fuel on board a vehicle;
(b) evaporating the alkanol fuel;
(c) dehydrating the evaporated alkanol fuel to form ether and water vapour in a catalyst;
(d) ether fumigation of the combustion air;
(e) providing the combustion mixture in the combustion chamber of the internal combustion engine by mixing a directly injected fuel with the ether-combustion air mixture;
(f) firing the internal combustion engine by combusting the combustion mixture in the combustion chamber,
and characterised in that the alkanol fuel is provided by a feed means in method step (a), in that the provided alkanol fuel is evaporated in an exhaust gas heat exchanger in method step (b), a portion of the exhaust gas arising during the firing of the internal combustion engine being fed for cooling to the exhaust gas heat exchanger and the alkanol fuel being evaporated, while absorbing the thermal energy dissipated during the cooling of the exhaust gas, in that, in the method steps (c) to (e), a portion of the fuel required for firing the internal combustion engine is fed by means of ether fumigation of the combustion air with mixing of the exhaust gas cooled in the exhaust gas heat exchanger to the combustion chamber of the internal combustion engine and in that, in method step (f), the firing of the internal combustion engine takes place by combustion of the combustion mixture to which the cooled, recirculated exhaust gas has been added.

The method according to the invention in particular allows economical engine operation which is very substantially low in emissions with alkanol fuels or with alkanol fuels and low-sulphur, mineral oil-based diesel fuels.

The subjects of the dependent claims 11 to 15 are advantageous embodiments of the method according to the invention. Details with regard to these advantageous embodiments and with regard to further advantages of the method directly emerge from the above explanations in conjunction with the internal combustion engine according to the invention according to claim 1 and in conjunction with the corresponding advantageous developments of the internal combustion engine according to the invention according to claims 2 to 10.

LIST OF REFERENCE NUMERALS 1 fuel tank
2 fuel delivery pump
3 injection valve
4 exhaust gas heat exchanger
5 catalyst
6 pressure peak valve
7 exhaust gas recirculation valve/EGR valve
8 exhaust gas outlet
9 intake section
10 engine
11 exhaust gas turbo charger
12 charge air inlet
13 exhaust gas outlet
14 air filter
15 combustion air line
16 exhaust line
17 combustion air cooling area
18 first line (combustion air line)
19 second line (exhaust gas line)
20 third line (exhaust gas line)
21 fourth line (exhaust gas line)
22 fifth line (exhaust gas line or exhaust gas ether line)
23 sixth line (exhaust gas line)
24 seventh line (ether line)
25 eighth line (ether line)/first alternative to 24
26 ninth line (ether line)/second alternative to 24
27 tenth line (ether line)/third alternative to 24

The invention claimed is:

1. A self-igniting internal combustion engine with ether fumigation of combustion air, comprising:
   a fuel delivery device for delivering a first alkanol portion of fuel for firing the internal combustion engine;
   an exhaust gas heat exchanger for cooling at least a portion of the exhaust gas arising during the firing of the internal combustion engine and to evaporate the first alkanol portion of the fuel while absorbing some of the thermal energy dissipated during the cooling of the exhaust gas;
   a catalyst for dehydrating the evaporated alkanol portion of fuel to form ether and water; and
   a water feed between the catalyst and a combustion chamber of the internal combustion engine, the water feed configured to include at least a portion of the water formed using the catalyst and configured to increase the water vapor content of the exhaust gas;
   wherein the fuel delivery device, the exhaust gas heat exchanger, and the catalyst are configured and connected to the combustion chamber of the internal combustion engine in such a way that:
      the first alkanol portion of the fuel for firing the internal combustion engine can be fed to the combustion chamber by ether fumigation of the combustion air, while mixing with the exhaust gas cooled in the exhaust gas heat exchanger, and
      the first alkanol portion of the fuel fed by ether fumigation provides 5 to 40% of the total fuel required to fire the internal combustion engine, and a directly injected oil-based diesel fuel provides the remaining fraction of the total fuel required to fire the internal combustion engine; and wherein the water feed is configured such that the portion of the water is introduced into the combustion chamber via the exhaust gas.

2. An internal combustion engine according to claim 1, wherein the fuel delivery device for delivering the first alkanol portion is configured for injecting the first alkanol portion of fuel into the exhaust gas heat exchanger and including a direct injection system for injecting the oil-based diesel fuel into the combustion chamber, the fuel delivery device for ether fumigation and for direct injection comprising at least one fuel tank, at least one respective fuel delivery pump and at least one respective injection valve.

3. An internal combustion engine according to claim 1 or claim 2, wherein the first alkanol portion of fuel comprises a monovalent alkanol fuel or a divalent alkanol fuel.

4. An internal combustion engine according to claim 1 or claim 2, further including an exhaust gas turbo charger to compress the combustion air, and a combustion air cooler for cooling the compressed combustion air, between a charge air inlet and the combustion chamber.

5. An internal combustion engine according to claim 4, wherein the exhaust gas cooled in the exhaust gas heat exchanger and the ether formed using the catalyst are mixed with the compressed and cooled combustion air.

6. An internal combustion engine according to claim 1 or claim 2, wherein the catalyst, as an active component for catalytic reactions, comprises at least one of titanium dioxide, a mixture of titanium dioxide with silicon dioxide and/or aluminium oxide, or an iron zeolite.

7. A method for ether fumigation of combustion air in a self-igniting internal combustion engine for vehicles, comprising:
(a) providing an alkanol fuel on board a vehicle;
(b) evaporating the alkanol fuel;
(c) dehydrating the evaporated alkanol fuel to form ether and water vapour in a catalyst;
(d) ether fumigating the combustion air to form an ether-combustion air mixture;
(e) providing a combustion mixture in a combustion chamber of the internal combustion engine by mixing a directly injected oil-based diesel fuel with the ether-combustion air mixture; and
(f) firing the internal combustion engine by combusting the combustion mixture in the combustion chamber,
wherein the alkanol fuel is provided by a feed device in act (a),
the provided alkanol fuel is evaporated in an exhaust gas heat exchanger in act (b),
at least a portion of an exhaust gas arising during the firing of the internal combustion engine is fed to and cooled in the exhaust gas heat exchanger, and the alkanol fuel being evaporated, while absorbing thermal energy dissipated during the cooling of the exhaust gas,
at least a portion of a fuel for firing the internal combustion engine is fed by ether fumigation of the combustion air with mixing in of the exhaust gas cooled in the exhaust gas heat exchanger to the combustion chamber of the internal combustion engine,
in act (f), the firing of the internal combustion engine takes place by combustion of the combustion mixture to which the cooled, recirculated exhaust gas has been added,
wherein at least a portion of the water vapour released during act (c) is fed to the ether-combustion air mixture, and the portion of the water vapour is introduced into the combustion chamber via the ether-combustion air mixture, and
wherein the alkanol fuel fed by ether fumigation provides 5 to 40% of the total fuel fed for firing the internal combustion engine, and the directly injected oil-based diesel fuel provides the remaining fraction of the total fuel fed for firing the internal combustion engine.

8. A method according to claim 7, wherein the alkanol fuel comprises a monovalent alkanol and/or a divalent alkanol.

9. A method according to claim 7 or claim 8, wherein the alkanol fuel in the exhaust gas heat exchanger is heated to a temperature of greater than 200° C.

10. An internal combustion engine according to claim 4, wherein the exhaust gas cooled in the exhaust gas heat exchanger and the ether formed using the catalyst are mixed in a controlled manner to form an exhaust gas-ether mixture, and the exhaust gas-ether mixture is mixed with the compressed and cooled combustion air via at least one exhaust gas recirculation valve for the controlled feeding of the exhaust gas-ether mixture.

* * * * *